C. E. WERNER.
Stills for Alcoholic Spirits.

No. 145,704.  Patented Dec. 16, 1873.

WITNESSES:

INVENTOR:
Carl Ernst Werner
By Knight Bros Attorneys.

UNITED STATES PATENT OFFICE.

CARL ERNST WERNER, OF BROOKFIELD, MISSOURI.

IMPROVEMENT IN STILLS FOR ALCOHOLIC SPIRITS.

Specification forming part of Letters Patent No. 145,704, dated December 16, 1873; application filed October 17, 1873.

*To all whom it may concern:*

Be it known that I, CARL ERNST WERNER, of Brookfield, in the county of Linn and State of Missouri, have invented certain Improvements in Distilling Apparatus, of which the following is a specification:

This invention relates to certain improvements in continuous distilling apparatus of the general character described in previous Letters Patent of the United States granted to me on the 24th day of January, 1854, and the 26th day of September, 1871.

My present invention consists, first, in an improved construction and arrangement of the beer-pipe and its accessories, by which the low wines are condensed and separated from the alcoholic vapors; second, in the combination of a pump with a low-wine receiver and still, as hereinafter described.

Figure 1:
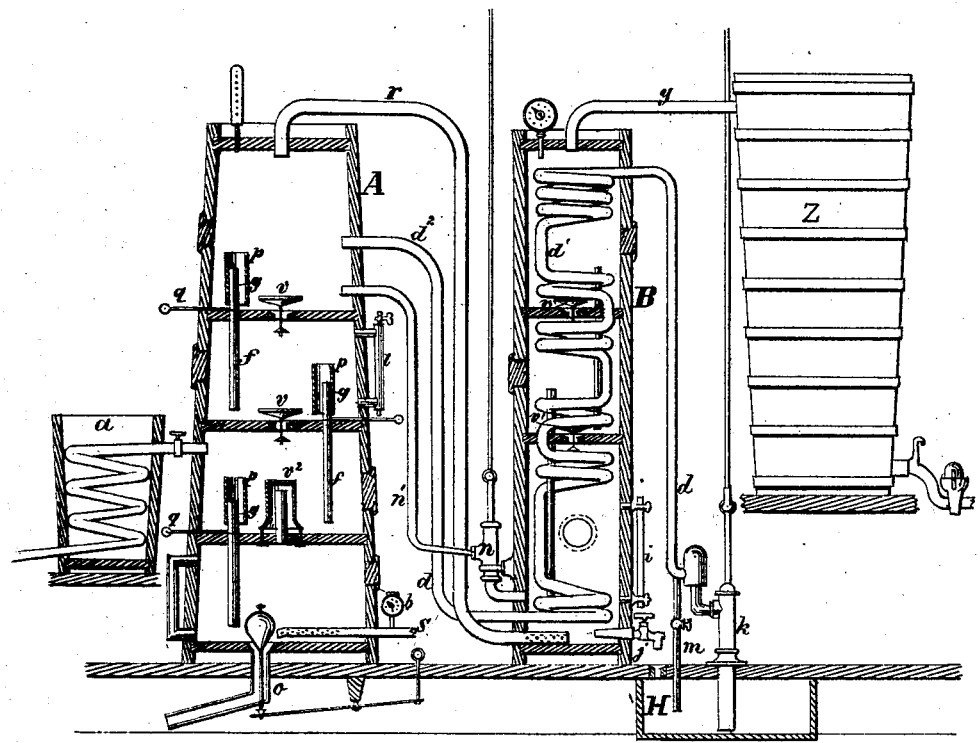
Figure 2:
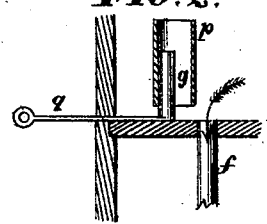
Figure 3:
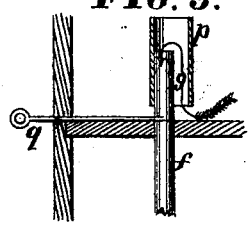

In the accompanying drawing, Figure 1 is a sectional elevation of an apparatus illustrating my invention. Figs. 2 and 3 are diagrams representing the movable conducting-pipe and shield in different positions.

The still A, having any desirable number of chambers, one above another, try-worm $a$, vapor-pipe $r$, vapor-pipe $y$, (leading to the alcohol-condenser Z,) the steam-pipe S, conducting-pipes $f$, steam-gage $b$, indicators $l$ and $i$, discharge-pipe $o$, reservoir H, and beer-pump $k$, may be constructed and arranged as described in my patent of September 26, 1871, or in any other preferred manner which may be adapted to the carrying out of my present improvements. I prefer to construct the low-wine condenser B with two, three, or more chambers, one above another, and to carry the beer-pipe $d$ up from the pump $k$ and introduce it into the condenser at or near the top, so that the alcoholic vapors will come in contact with the coldest part of the coil, $d^1$, first, before their discharge from the low-wine condenser to the alcohol-condenser. The partitions between the chambers in the still A and in the low-wine condenser B are provided with automatic valves $v\ v^1$, of any suitable form, or pipes surmounted by hoods $v^2$, to permit the passage of steam and vapors under pressure, and at the same time to distribute them through the liquid. The beer, after becoming warmed by the absorption of latent heat from the alcohol vapors in passing through the coiled portion of the pipe within the low-wine condenser is conducted by a continuation of the same pipe, $d^2$, into the upper chamber of the still A. $n$ is a pump, and $n'$ a pipe, employed to take low wine from the lower part of the condenser B to the upper chamber of the still. If preferred, the low wine may be drawn off by a cock, $j$, into the beer-reservoir H. The conducting-pipes $f$, through which the beer descends from one chamber to another of the still, are surmounted by sliding pipes $g$, carrying cylindrical shields $p$, rising high enough to prevent overflow of beer, and descending nearly to the bottom, so that only the lowest stratum of beer can enter within the shield and reach the pipe. A rod, $q$, is attached to the movable pipe $g$, to set it in either position shown in Figs. 2 and 3. Fig. 3 shows its position in the normal operation of the apparatus, and Fig. 2 the position when it is drawn off the conducting-pipe to permit the discharge of the whole of the beer.

My continuous process of distilling is very economical in material, as well as in fuel, time, and labor, and I am enabled to produce ninety per cent. alcohol continuously at a single operation.

I claim as new and desire to secure by Letters Patent—

1. The combination and arrangement of the still A, condenser B, vapor-pipe $r$ leading from top of still to bottom of condenser, pump $k$, descending coil $d^1$, and conducting-pipes $d\ d^2$, all as herein described, for the purpose set forth.

2. The combination of the pump $n$ and pipe $n'$ with the condenser B and still A, for taking low wines from one to the other, as explained.

CARL ERNST WERNER.

Witnesses:
 OCTAVIUS KNIGHT,
 WALTER ALLEN.